(12) United States Patent
Chen et al.

(10) Patent No.: US 7,670,686 B2
(45) Date of Patent: Mar. 2, 2010

(54) LONG-TERM HYDROPHILIC MODIFICATION OF PDMS SUBSTRATE AND METHOD FOR MANUFACTURING THE SAME

(75) Inventors: Shu-Hui Chen, Tainan (TW); Makamba Honest, Tainan (TW); Ya-Yu Hsieh, Tainan (TW); Wang-Chou Sung, Tainan (TW)

(73) Assignee: National Cheng Kung University, Tainan (TW)

( * ) Notice: Subject to any disclaimer, the term of this patent is extended or adjusted under 35 U.S.C. 154(b) by 957 days.

(21) Appl. No.: 11/436,664

(22) Filed: May 19, 2006

(65) Prior Publication Data

US 2006/0263612 A1 Nov. 23, 2006

(30) Foreign Application Priority Data

May 20, 2005 (TW) ............................... 94116473 A (51) Int. Cl.
*B32B 25/20* (2006.01)
(52) U.S. Cl. ...................................... 428/447; 428/451
(58) Field of Classification Search ................. 428/447, 428/451
See application file for complete search history.

(56) References Cited

U.S. PATENT DOCUMENTS

2004/0135967 A1* 7/2004 Carney et al. ............... 351/159

FOREIGN PATENT DOCUMENTS

WO 97/49740 * 12/1997

* cited by examiner

*Primary Examiner*—Kuo-Liang Peng
(74) *Attorney, Agent, or Firm*—Bacon & Thomas, PLLC (57) ABSTRACT

The present invention relates to a hydrophilic surface structure of the non-hydrophilic substrate and the manufacturing method for using the same. The hydrophilic substrate surface structure is fabricated by forming an amphiphilic polymer layer, a cross-linked stacking layer, and a hydrophilic layer in sequence on the surface of a non-hydrophilic substrate. For example, the hydrophobic surface of poly(dimethylsiloxane) (PDMS) can be made from hydrophobic to hydrophilic and the hydrophilicity can be retained for a long period of time and resist protein adsorption. The hydrophilic thin films give long term stability to the PDMS surface by resisting hydrophobicity recovery, which is the major problem with PDMS. The disclosed method can further be used in the immobilization of protein and other molecules. This method can also be used for modifying other substrates which suffer problems of surface instability.

15 Claims, 9 Drawing Sheets

LONG-TERM HYDROPHILIC MODIFICATION OF PDMS SUBSTRATE AND METHOD FOR MANUFACTURING THE SAME

BACKGROUND OF THE INVENTION

1. Field of the Invention

The present invention relates to a hydrophilic substrate surface structure and the preparation method thereof, more particularly relates to a method for creating a stable long-term hydrophilic poly(dimethylsiloxane) PDMS surface. PDMS shows unstable surface chemistry which is characterized by hydrophobicity recovery. The creation of a stable hydrophilic PDMS surfaces is important for various applications.

2. Description of the Related Art

The substrate surface treatment is an important research topic in material science because it gives the substrate more desirable surface properties, ex. corrosion resistance, biomolecule adsorption resistance, and anti-oxidization, which are able to slow down the ageing of the material or make it more applicable.

With the development of biotechnology, the treatment of substrate surface is gaining attention as more biochemical materials are put into use. Biochemical materials include biochip substrates, cell culturing substrates and human implant materials. For example biochip substrates. These substrates can be made using silicon chips, glasses or polymers. Biochips may be used in medical testing, environmental testing, food testing, new drug development, basic research, military defense, and chemical synthesis. Biochips available in the present market are classified into gene chip, protein chip, and lab-on-a-chip. Lab-on-a-chip is designed according to the needs and are produced by various reactions on the chip. Currently, biochemical experiments that may be carried out on lab-on-a-chip include polymerase chain reaction (PCR) with gene amplification function, nucleic acid sequencing reaction, microfluidics, electrophoresis, mass spectrograph, antigen-antibody binding, and regular enzymatic reaction.

The microfluidic chip for biomedical testing fabricated by MEMS process offers the advantages of high performance, low sample consumption, low energy consumption, small size, and low cost. The design that integrates various procedures on the same chip provides a great potential and a market value.

For most materials used in applications such as biochips, cell culturing substrates or human implants, it is usually necessary to alter the surface characteristics by surface modification of the substrate. For example, poly(dimethylsiloxane) (PDMS), a widely used biomedical material exhibits unstable surface characteristics due to the recovery of hydrophobicity. Currently, the PDMS surface is typically modified by means of direct attachment of an in-situ generated polymer layer on to the PDMS surface or by dynamic coating on the PDMS. Those methods are simple, but the modified PDMS surface lacks long-term stability, which means it can not be exposed to air for a long periods of time and thus becomes unable to resist hydrophobicity recovery. The hydrophobicity recovery renders the surface unable to resist protein adsorption. Therefore, it is necessary to develop a widely applicable substrate surface modification method that can resist hydrophobicity recovery and impart long term hydrophilicity to the surface of the PDMS. This would give durability to various devices that are made of substrates that are usually unstable.

SUMMARY OF THE INVENTION

Poly(dimethylsiloxane) PDMS and similar materials present problems of surface instability through hydrophobicity recovery. This limits the application of these materials in various fields. To address the drawbacks of prior methods and effectively enhance the surface stability of the unstable substrate surface, the present invention provides a stable hydrophilic thin film on the substrate surface and the procedures involved in the surface modification. In this method polyelectrolytes layers are electrostatically adsorbed on to the PDMS surface (electrostatic self assembly) to form multilayer thin films. The thin films are further stabilized by chemical crosslinking. Further, the thin films are covalently capped with a layer of polyethylene glycol (PEG) which gives the surface resistance to protein adsorption.

The present invention is to provide a stable hydrophilic surface to a non-hydrophilic unstable substrate. The instability of the substrate comes as a result of the migration hydrophobic groups to the surface from the bulk of the substrate. The long-term hydrophilic surface modification structure of PDMS, comprising: a PDMS substrate having a surface; an amphiphilic polymer layer deposited on the surface of the substrate and the amphiphilic polymer having a hydrophobic functional group and a reactive hydrophilic functional group; and a cross-linked stacking layer deposited on the amphiphilic polymer layer and comprising at least a thin layer having a positively charged functional group and at least a thin layer having a negatively charged functional group stacked alternately from the bottom; wherein a covalent bond is formed between the amphiphilic polymer layer, the cross-linked stacking layer, and between the layers in the cross-linked stacking layer by the reactions between the reactive functional groups, the positively charged functional group and negatively charged functional group aforesaid. The crosslinked layer imparts stability to the unstable polymer surface by resisting hydrophobicity recovery to give long-term hydrophilicity The cross-linked stacking layer of the hydrophilic surface structure of the non-hydrophilic substrate further comprises a protein-adsorption resistant layer. A covalent bond is formed between the protein-adsorption resistant layer and the cross-linked stacking layer.

Another object of the present invention is to provide a substrate immobilized with bio-molecules and resistant to protein adsorption. The substrate comprises: a polymer substrate having a surface; an amphiphilic polymer layer deposited on the surface of the substrate and the amphiphilic polymer having a hydrophobic functional group and a reactive functional group; a cross-linked stacking layer disposed on the amphiphilic polymer layer and comprising at least a thin layer having a positively charged functional group and at least a thin layer having a negatively charged functional group stacked alternately from the bottom; a protein-adsorption resistant layer deposited on the cross-linked stacking layer and comprising a protein-adsorption resistant polymer having a reactive functional group, which is capable of forming a covalent bond with the cross-linked stacking layer; and biomolecules attached to the protein resistant layer; wherein the covalent bonds are formed between the amphiphilic polymer layer and the cross-linked stacking layer, between the layers in the cross-linked stacking layer, the cross-linked stacking layer and the protein-adsorption resistant layer, the protein-adsorption resistant layer and the bio-molecules using the reactive functional groups, the positively charged functional group and the negatively charged functional group aforesaid.

Another object of the present invention provides a method for preparing a hydrophilic substrate surface structure, comprising the steps as follow: (a) providing a polymer substrate, wherein said polymer substrate has a surface; (b) forming an amphiphilic polymer layer on said polymer substrate surface, said amphiphilic polymer having a hydrophobic functional group and a reactive functional group; (c) forming a cross-linked stacking layer on said amphiphilic polymer layer, said cross-linked stacking layer comprises at least a thin layer having a positively charged functional group and at least a thin layer having a negatively charged functional group stacked alternately from the bottom; and (d) providing a cross-linking reagent in contact with said amphiphilic polymer layer and said cross-linked stacking layer to form covalent bonds between said amphiphilic polymer layer and said cross-linked stacking layer, and between the layers of said cross-linked stacking layer.

The protein-adsorption resistant polymer is provided with a reactive functional group, which is capable of reacting with the cross-linked stacking layer to form a covalent bond and thereby forming a protein-adsorption resistant adsorption layer on the cross-linked stacking layer. Another object of the present invention is to provide a method for preparing the substrate immobilized with bio-molecules, comprising the steps of: (a) providing a polymer substrate which has a surface; (b) forming an amphiphilic polymer layer on the surface of the polymer substrate, the amphiphilic polymer having a hydrophobic functional group and a reactive functional group; (c) forming a cross-linked stacking layer on the amphiphilic polymer layer, the cross-linked stacking layer comprising at least a thin layer having a positively charged functional group and at least a thin layer having a negatively charged functional group stacked alternately from the bottom; (d) mixing the bio-molecules to be immobilized with a protein-adsorption resistant adsorption polymer to form a covalent bonding there between; and (e) putting the resulting mixture in (d) contact with the cross-linked stacking layer and putting a cross-linking reagent in contact with the amphiphilic polymer layer, the cross-linked stacking layer, and the protein-adsorption resistant polymer for forming covalent bonds between the amphiphilic polymer layer and the cross-linked stacking layer, and between the layers in the cross-linked stacking layer, and form a protein-adsorption resistant layer having bio-molecules immobilized thereon on the cross-linked stacking layer; the cross-linked stacking layer and the protein-adsorption resistant layer are covalently bonded.

The method disclosed in the present invention allows the substrate surface to retain hydrophilicity after long-termed exposure in air and effectively resist protein adsorption. The modified surface therefore resists both hydrophobicity recovery and protein adsorption. Furthermore, when the hydrophilic substrate surface structure contains bio-molecule derivatives, the substrate surface possess bioactivity and is capable of ruling out the non-specific adsorption and screening the specific bio-molecules.

DETAILED DESCRIPTION OF THE INVENTION

Figure 1:
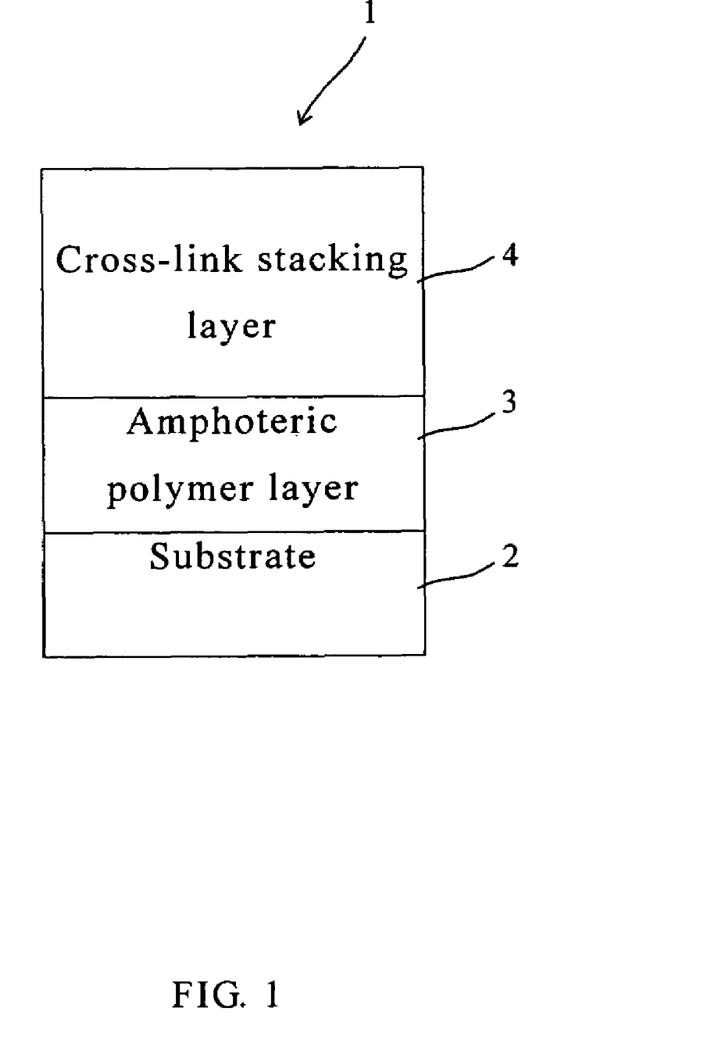
FIG. 1 is a diagram of the hydrophilic substrate surface structure of the invention.

As shown in FIG. 1, the hydrophilic substrate surface structure 1 of the invention possesses a layered structure as described below:

polymer substrate 2/amphiphilic polymer layer 3/cross-linked stacking layer 4

The polymer substrate 2 used in an example of the present invention is poly(dimethylsiloxane) (PDMS), a commonly used biomaterial. The polymer substrate materials used in the invention include but are not limited to PDMS, polystyrene (PS), polypropylene (PP), polymethyl methacrylate (PMMA), polycarbonate (PC), polyisopropylene (PI) and mixtures thereof.

Figure 2:
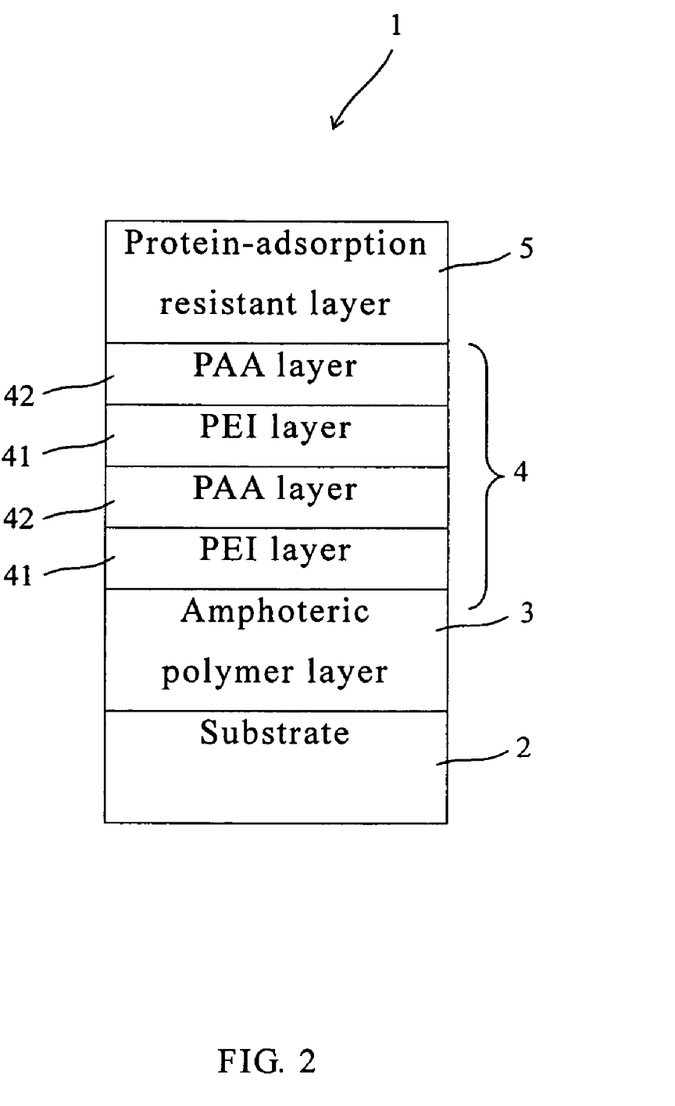
FIG. 2 shows an embodiment of the hydrophilic substrate surface structure of the invention.
Figure 3:
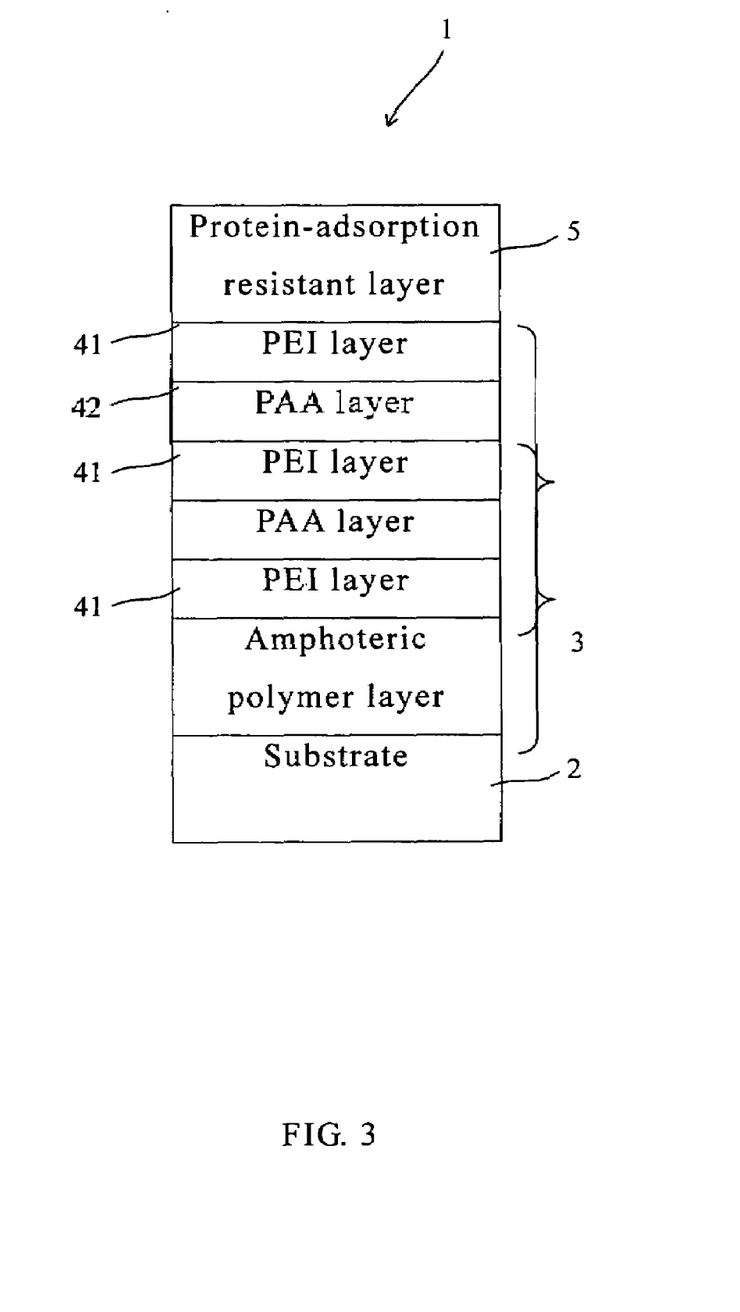
FIG. 3 shows another embodiment of the hydrophilic substrate surface structure of the invention.

The surface of substrate 2 can be treated by oxygen plasma for cleaning and activation purpose before the amphiphilic polymer layer 3 is formed over it. The method for cleaning and activating substrate 2 surface is not limited to oxygen plasma approach. Exposing the surface to a corona discharge can achieves the same effect. The amphiphilic polymer in the hydrophilic surface structure 1 is a polymer having both a hydrophobic (non-polar) functional group and a reactive functional group with higher polarity. The reactive functional group is an amino group or a carbonyl group; the carbonyl group can be a carboxyl, aldehyde or ester functional group. The hydrophobic functional group includes aromatic and straight-chained alkyl group with lower polarity. The amphiphilic polymer layer 3 adsorbs onto the surface of substrate 2 by its hydrophobic functional group, while the polar carbonyl or amino group forms covalent bond with subsequent layer. The amphiphilic polymer used in the examples of the invention is hydrolyzed polystyrene maleic anhydride (h-PSMA), in which the phenyl group is the hydrophobic functional group, while acid anhydride hydrolyzed to carboxylate is the reactive functional group. On top of the amphiphilic polymer layer 3 is the cross-linked stacking layer 4 comprising at least a thin layer having a positively charged functional group (e.g. amino group) and at least a thin layer having a negatively charged functional group (e.g. carbonyl group) that stack alternately from bottom up. There is no special restriction for the number of alternate stacking which may vary depending on actual needs, but should have at least two stacking layers. The thin layer is made of polymer material or functional group-modified micron or nano-sized structure. In the example of the invention, the thin layer in the cross-linked stacking layer 4 having positively charged functional group is made of polyethyleneimine (PEI), and the thin layer having negatively charged functional group is made of polyacrylic acid (PAA). Given that the amphiphilic polymer layer 3 on which the cross-linked stacking layer 4 is disposed is h-PSMA that comes with a carboxyl group, the bottommost thin layer of cross-linked stacking layer 4 in contact with the amphiphilic polymer layer 3 would be an amino-containing PEI layer 41, and on top of which would be a PAA layer 42, and on top on which would be another PEI layer 41, and so on as shown in FIG. 2. As shown in FIG. 2 and FIG. 3, the topmost layer of cross-linked stacking layer 4 can be a positively charged or negatively charged thin layer without being dictated by the functional group contained in the amphiphilic polymer layer. Referring to FIG. 2, if the cross-linked stacking layer 4 consists of two PEI layers 41 and two PAA layers 42 alternately stacked upon each other, and its bottommost layer is a PEI layer 41, then the topmost layer of the cross-linked stacking layer 4 is a carbonyl-containing PAA layer 42. Referring to FIG. 3, if the cross-linked stacking layer 4 consists of three PEI layers 41 and two PAA layers 42, and its bottommost layer is a PEI layer 41, then the topmost layer of the cross-linked stacking layer 4 is also PEI layer 41.

The contact between amphiphilic polymer layer 3 and cross-linked stacking layer 4 does not directly bring about covalent bond. Such reaction relies on the presence of a cross-linking reagent. After the surface of substrate 2 is added with the amphiphilic polymer layer 3 and cross-linked stacking layer 4, substrate 2 is brought in contact with a cross-linking reagent to activate the formation of covalent bond between amphiphilic polymer layer 3 and cross-linked stacking layer 4 and between the layers in the cross-linked stacking layer 4 (41 and 42 in FIG. 2). The crosslinking reagents used by the invention includes but is not limited to the commonly used EDC/NHS and $H_3PO_4/K_2SO_4$ buffer solution of sodium cyanoborohydride. Other cross-linking reagents with similar action are acceptable.

Figure 4:
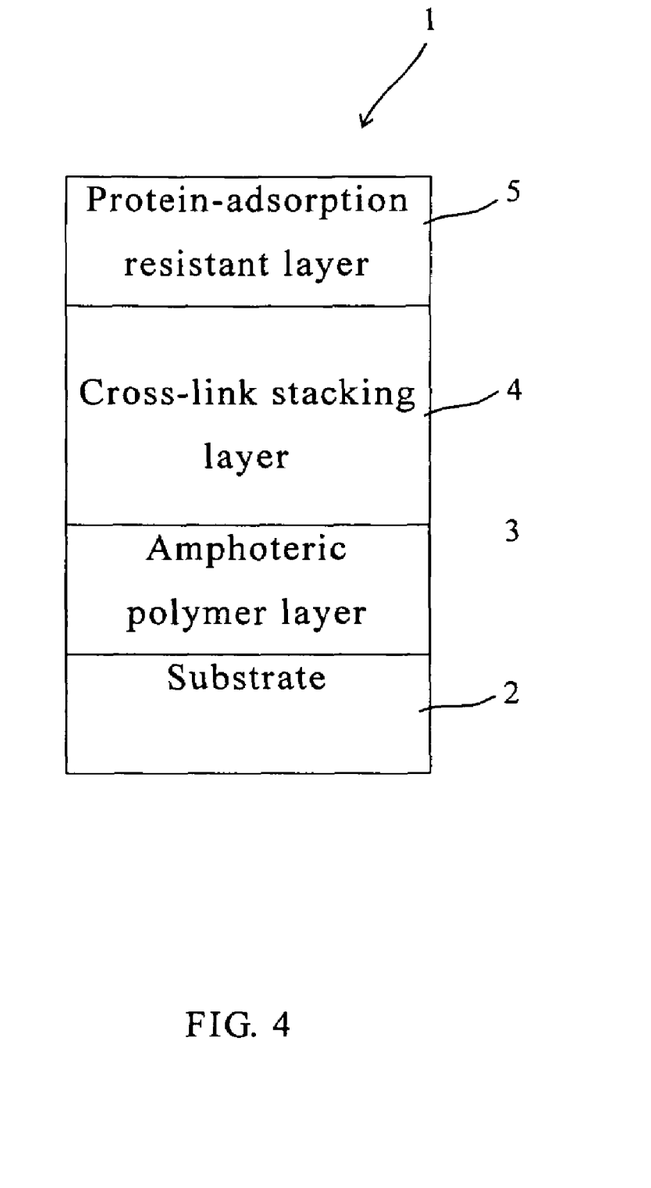
FIG. 4 is a diagram showing the hydrophilic substrate surface structure that is resistant to protein adsorption.

Another example of the hydrophilic substrate surface structure 1' of the invention as shown in FIG. 4 possesses a layered structure as described below:

substrate 2/amphiphilic polymer layer 3/cross-linked stacking layer 4/protein-adsorption resistant layer 5.

The difference between structure 1 and 1' is that the latter has further a protein-adsorption resistant layer overlaying the cross-linked stacking layer 4. The protein-adsorption resistant layer is formed by adding further a protein-adsorption resistant polymer in the cross-linking reagent used in the steps for preparing structure 1. Such protein-adsorption resistant polymer contains a functional group resistant to protein adsorption and a reactive functional group corresponding to the topmost polymer layer of the cross-linked stacking layer 4 so as to form a protein-adsorption resistant layer 5 on top of the cross-linked stacking layer 4. The protein-adsorption resistant polymer is selected based on the functional group contained in the topmost thin layer in the cross-linked stacking layer 4. If the topmost thin layer possesses positively charged functional group, the protein-adsorption resistant polymer selected must have a functional group that can react with that positively charged functional group; if the topmost thin layer possesses negatively charged functional group, the protein-adsorption resistant polymer selected must have a functional group that can react with that negatively charged functional group. The protein-adsorption resistant polymer used in the example of the invention includes PEG dialdehyde, PEG dicarboxylate, and PEG diamine, in which the ethylene glycol functional group can resist protein adsorption, while PEG dialdehyde and PEG dicarboxylate are carbonyl-containing protein-adsorption resistant polymers having negatively charged functional group, and PEG diamine is amino-containing protein-adsorption resistant polymer having positively charged functional group.

While covalent bonds are formed between the amphiphilic polymer layer 3 and cross-linked stacking layer 4 on the surface of substrate 2 and between the layers in the cross-linked stacking layer 4 under the activity of a cross-linking reagent, the protein-adsorption resistant polymer also forms covalent bonding with the cross-linked stacking layer 4, creating further a protein-adsorption resistant layer 5 on top of the cross-linked stacking layer 4.

Furthermore, bio-molecules can be immobilized on the hydrophilic substrate surface structure 1'. Those bio-molecules include antigen, antibody, ligand, receptor and peptide. Using the method just described to prepare substrate carrying specific bio-molecules can resist the adsorption of non-specific proteins. More so, the bio-molecules thereon can be used to screen specific compound or protein. Thus such substrate may be applied in the development of biochips. Protein molecules possess many active functional groups, such as amino group, carboxyl group and glycosyl group. These functional groups can selectively react with the reactive functional groups in protein-adsorption resistant polymers. For example, if the protein-adsorption resistant polymer has an amino group, it can undergo reductive amination, or if the protein-adsorption resistant polymer has an aldehyde group, it can undergo aldehyde condensation to produce covalent bond with the cross-linked stacking layer to achieve the purpose of protein immobilization.

The advantages of the present invention are further depicted in the illustration of examples, but the descriptions made in the examples should not be construed as a limitation on the actual application of the present invention.

EXAMPLE 1

The Preparation and Modification of the Substrate Surface

The present example applies PDMS as the substrate material. The preparation of PDMS polymer from monomers is prior art and will not be elaborated. The procedure for modifying substrate surface is as follows: Subject the PDMS substrate obtained to one minute of cleaning and activation with oxygen plasma, then leave the PDMS substrate in PSMA solution overnight and a PSMA layer (amphiphilic polymer layer) will form on the PDMS substrate surface. Subsequently, leave the PDMS substrate in PEI solution for one hour and a PEI layer will form on the PSMA layer. Next leave the PDMS substrate in PAA solution for one hour, and a PAA layer will form over the PEI layer. Repeat the steps of PEI and PAA layer formation as many times as desired. In the formation of each layer, use de-ionic water to rinse the layer surface.

To initiate the cross-linked reaction, the substrate prepared above is soaked in EDC/NHS solution at 4° C. overnight for the amino groups and acid groups in the layers to cross-linked and form amide bonds. The formation of hydrophilic layer can be carried out while the cross-linked reaction takes place. If the topmost layer of the cross-linked stacking layer is a PAA layer, PEG diamine is added to the EDC/NHS solution to form a PEG layer over the PAA layer after the crosslinking reaction. If the topmost layer of cross-linked stacking layer is a PEI layer, PEG dicarboxylate is added to the EDC/NHS solution to form a PEG layer over the PEI layer. However if liquid PEG dialdehyde is used for the hydrophilic layer, the substrate should be soaked in $H_3PO_4/K_2SO_4$ buffer solution of sodium cyanoborohydride that contains PEG dialdehyde at 60° C. overnight before soaking the substrate in EDC/NHS overnight to undergo crosslinking reaction.

Figure 5:
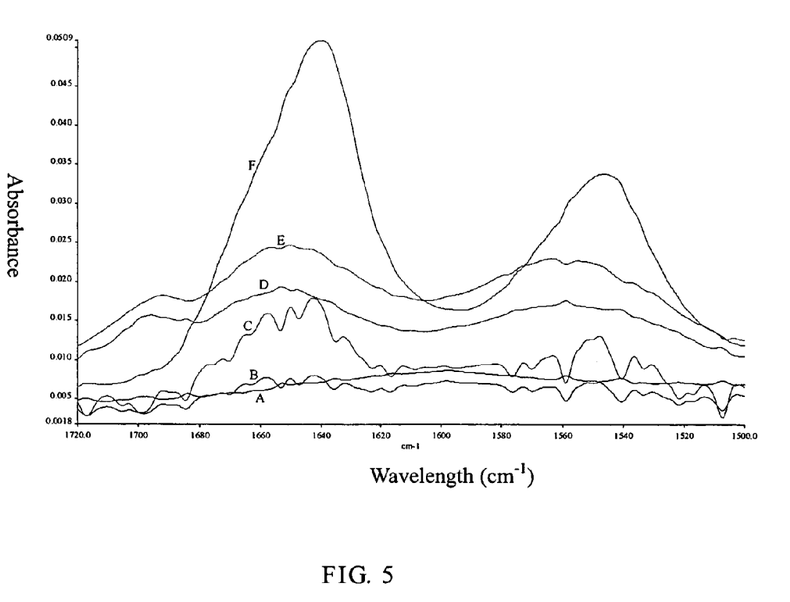
FIG. 5 is the total reflection IR spectrographs of substrate surfaces with different layer patterns.

Comparison 1: The Characteristics of the Functional Groups which is Provided with the Substrate Surface of Different Layers FIG. 5 shows the total reflection IR spectra of substrates with different layer patterns and different extents of cross-linked, in which A has the PDMS/PSMA/(PEI/PAA)$_2$/PEG dicarboxylate layer pattern that did not undergo cross-linked reaction, where (PEI/PAA)$_2$ represents repetitive formation of PEI/PAA stack, and numeral 2 means the stack was repeated twice; B is PDMS/PSMA/PEI; C is PDMS/PSMA/PEI/PAA; D is PDMS/PSMA/(PEI/PAA)$_2$; E PDMS/PSMA/(PEI/PAA)$_3$; and F PDMS/PSMA/(PEI/PAA)$_4$/PEI. All layer patterns, except for A underwent cross-linked reaction to produce covalent bonds between the layers. The preparation of each layer pattern can refer to Example 1. In FIG. 5, wavelength 1650 cm$^{-1}$ represents C—O bond in the amide functional group, and 1550 cm$^{-1}$ represents N—H bond in the amide functional group. The IR spectra reveal the presence of specific functional groups on microchannel surface.

It is clear from FIG. 5 that as the number of layer on the substrate increases, the activity of C—O functional group and N—H functional group becomes stronger, which helps enhance the hydrophilicity of substrate surface.

Comparison 2: Checking the Stability of the Thin Film Coating using IR Spectra Over a Period of 4 Months.

Figure 6:
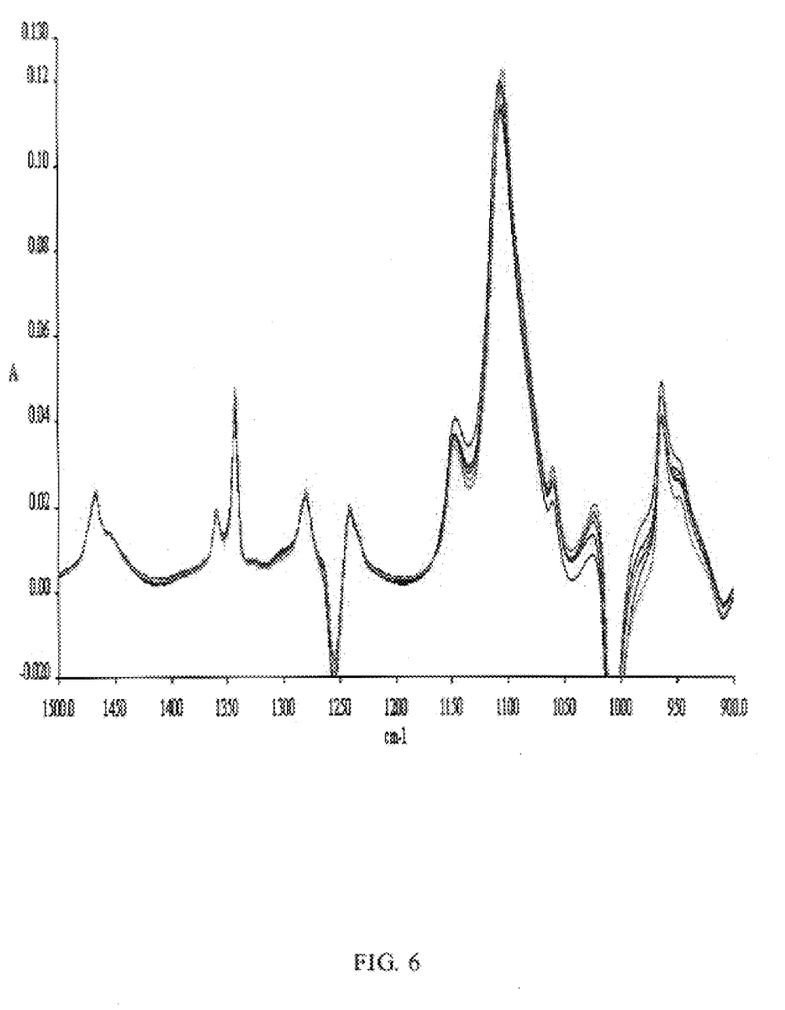
FIG. 6 is the contact angle curve of hydrophilic substrate surface structures with different layer patterns.

FIG. 6 Checking the stability of the thin film coating capped with PEG over a period of 4 months. The IR spectra were measured on the same sample to see if the coating was affected by migration of hydrophobic groups from the PDMS bulk. Stability studies on the coating h-PSMA/(PEI/PAA)4/PEI/PEG dialdehyde 3400 using FTIR. First day (black line), after 7 days (blue line), after 15 days (red line), after 34 days (pink line), after 73 days (gray line) and after 123 days (light blue line). The spectra have roughly the same intensity, showing that the coating is stable for over 4 months while exposed to air. It can be deduced that the thin film is not sinking into the bulk PDMS because it resists the movement of the hydrophobic groups to the surface. No such stability has been reported to date for PDMS.

Comparison 3: the Protein Adsorption Characteristics of the Substrate Surface

Figure 7:
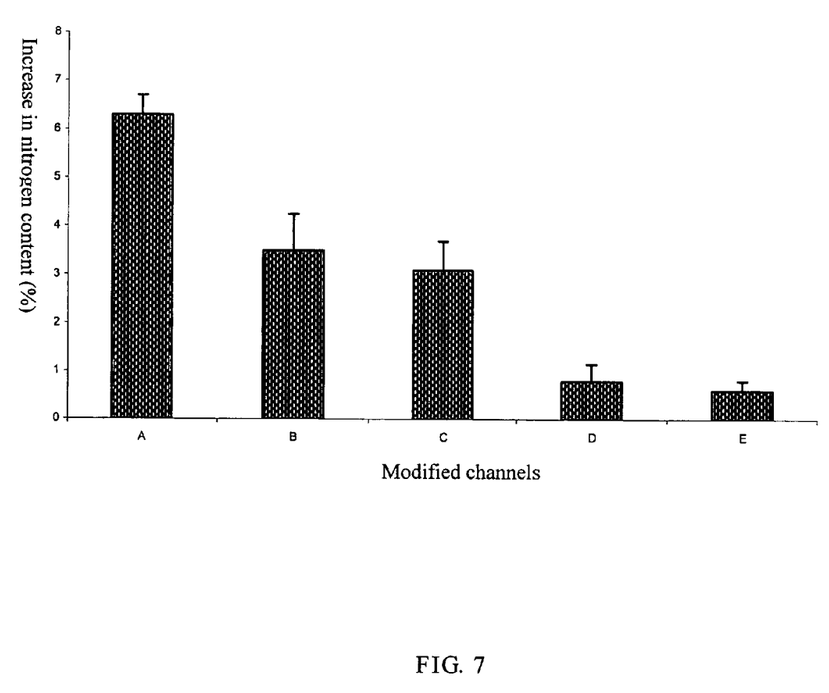
FIG. 7 is a bar chart of serum-soaked surface nitrogen content on substrate surfaces with different layer patterns under electron spectroscopy for chemical analysis.

To compare the adsorption of proteins in mouse serum on substrates with different layer patterns, substrates were put into contact with solution containing mouse serum and nitrogen content on substrate surface was measured with electron spectroscopy for chemical analysis (ESCA). The results are as shown in FIG. 7, in which A is unmodified PDMS substrate, B is PDMS/PSMA/(PEI/PAA)$_4$/PEI, C is PDMS/PSMA/(PEI/PAA)$_4$/PEI/PEG(dicarboxylate), D is PDMS/PSMA/(PEI/PAA)$_4$/PEI/PEG(diamine), and E is PDMS/PSMA/(PEI/PAA)$_4$/PEI/PEG(dialdehyde).

As shown, unmodified PDMS substrate surface has high nitrogen content, representing significant protein adsorption. For substrates that were hydrophilically treated and modified with PEG dicarboxylate, nitrogen content on their surface was markedly reduced. Microchannels that were modified with PEG diamine or PEG dialdehyde had the lowest nitrogen content. In comparison with unmodified microchannels, PEG modified microchannels had protein adsorption reduced by more than 90%. These findings demonstrate that microchannels with hydrophilic modification treated and modified with PEG can effectively prevent protein adsorption. Microfluidic chips with such channel surface can offer greater analytical precision.

EXAMPLE 2

The Preparation and Modification of the Substrate Surface, which is Provided with Immobilized Protein Take PDMS substrate and repeat the step of forming PEI/PAA stacking layer in Example 1 until the desired number of layers is reached. Subsequently, undergo reductive amination or aldehyde condensation for protein immobilization. In the example of aldehyde condensation, after the step of cross-linked stacking layer formation is completed, premix PEG dialdehyde and the protein to let the aldehyde group in protein react with the aldehyde group on PEG. Next let the premix solution react with the amino group on cross-linked stacking layer and soak the substrate in $H_3PO_4/K_2SO_4$ buffer solution of sodium cyanoborohydride overnight to proceed with cross-linked reaction. Finally, protein is immobilized on the substrate surface. In this example, hemoglobin antibody was immobilized on PEG modified microchannel surface. For assay, hemoglobin antigen was injected into microchannels. After 30 minutes, $H_3PO_4/K_2SO_4$ buffer solution was used to rinse out unbound antigen. Finally, bound antigen was eluted into mass spectrometer with ammonium carbonate buffer for assay.

Figure 8A:
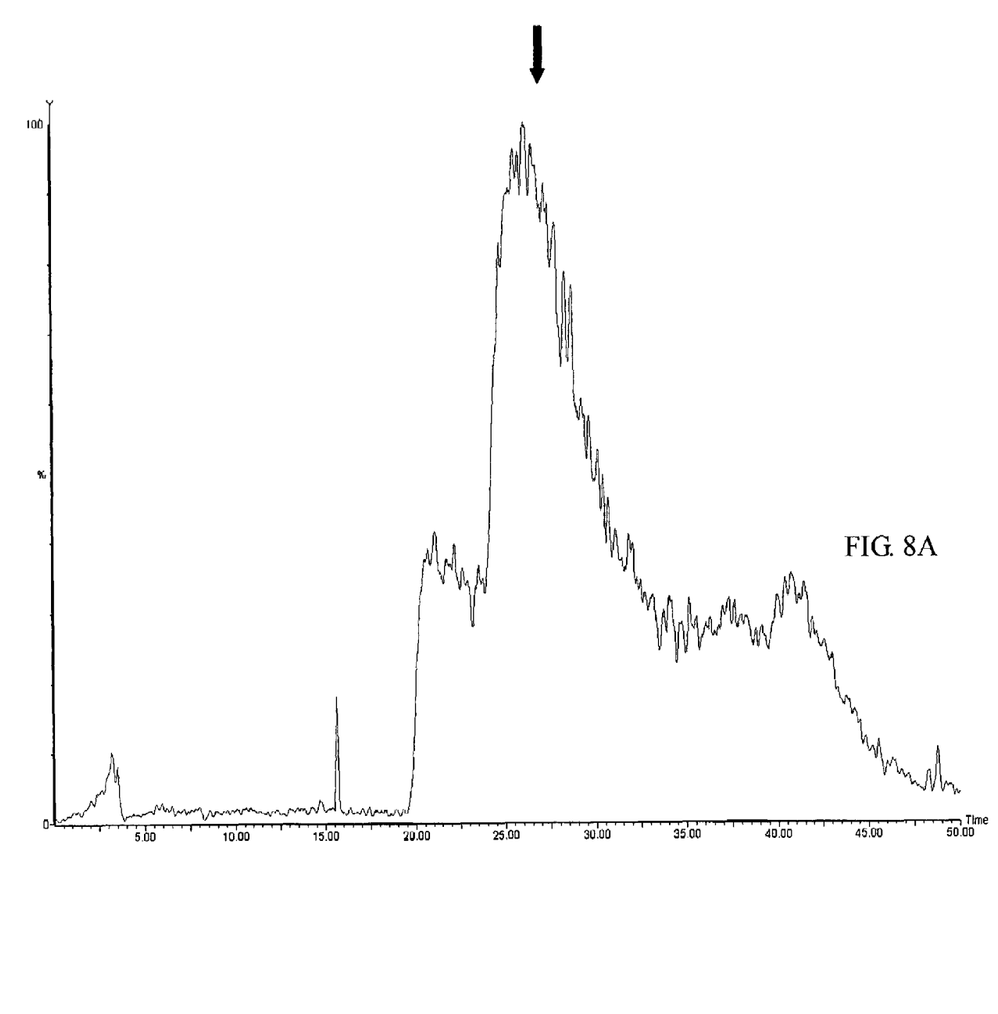
FIG. 8A is a chromatograph of eluted hemoglobin antibody.
Figure 8B:
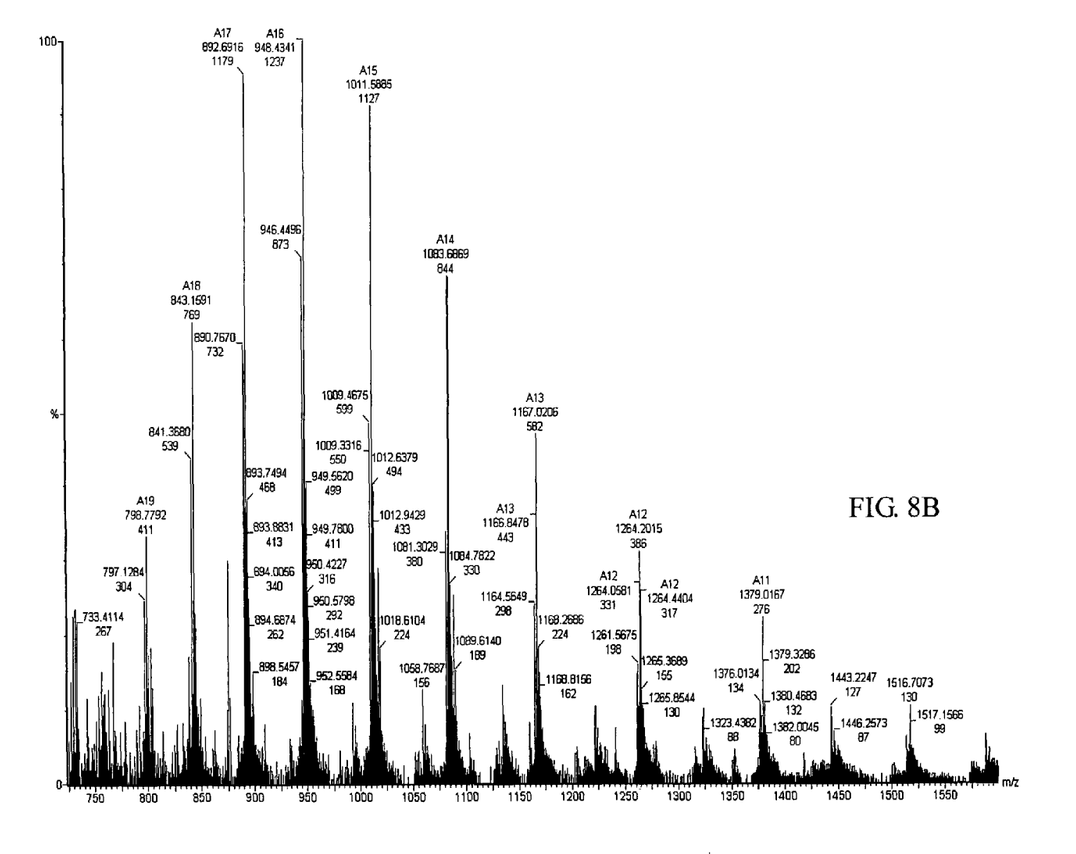
FIG. 8B is an ion-selective chromatography (m/z: 948.337 amu) at specific time (pointed by arrow in FIG. 8A) as assayed by mass spectrometer.

FIG. 8A is a chromatograph of eluted hemoglobin antibody, and FIG. 8B is an ion-selective chromatography (m/z: 948.337 amu) at specific time (pointed by arrow in FIG. 8A) as assayed by mass spectrometer. As shown, hemoglobin antigen bound to the immobilized antibody could be eluted with ammonium carbonate buffer into the mass spectrometer. The results demonstrate that PEG functional group of the invention can undergo protein immobilization to confer substrate surface with bioactivity. Such microfluidic chip system can be used for drug screening.

According to the above descriptions, the attached thin film gives much longer stability to the PDMS surface than previously reported methods. The stability is seen in the IR spectra which were measured over a 4 month period; the spectra were virtually unchanged. This stability comes from the film's ability to resist the movement of hydrophobic groups to the surface from the PDMS bulk. The hydrophilicity of the modified surface is conserved for long periods. PEG groups can be added to the thin films to give protein resistance to the thin films.

Other Embodiments

The preferred embodiments of the present invention have been disclosed in the examples. All modifications and alterations without departing from the spirits of the invention and appended claims, including other embodiments shall remain within the protected scope and claims of the invention.

What is claimed is:

1. A long-term hydrophilic surface modification structure of PDMS comprising:
   a PDMS substrate with a surface;
   an amphiphilic polymer layer deposited on said surface, and said amphiphilic polymer having a hydrophobic functional group and a reactive functional group, said reactive functional group of said amphiphilic polymer comprises a carboxyl, aldehyde or ester functional groups, and the amphiphilic polymers comprising hydrolyzed polystyrene maleic anhydride (h-PSMA)

which fabricated by hydrolyzing the anhydride groups of polystyrene maleic anhydride to produce carboxylate groups; and a cross-linked stacking layer disposed on said amphiphilic polymer layer, and said cross-linked stacking layer comprising at least a thin layer having a positively charged functional group and at least a thin layer having a negatively charged functional group stacked alternately from the bottom;

wherein a plurality of covalent bonds are formed between said amphiphilic polymer layer, said cross-linked stacking layer and the layers in said cross-linked stacking layer by the reactions of said reactive functional group, said positively charged functional group and said negatively charged functional group.

2. The structure of claim 1, wherein said cross-linked stack layer having a thin layer of positively charged functional group comprises polyethyleneimine (PEI), polyglucosamine, polyallylamine, polylysine or an amino-modified micron or nano-sized structure.

3. The structure of claim 1, wherein said cross-linked stacking layer having a thin layer of a negatively charged functional group is made of polyacrylic acid (PAA), polymethyl acrylate or a carbonyl-modified micron or nano-sized structure, and said carbonyl group comprises a carboxyl, aldehyde or ester functional group.

4. A long-term hydrophilic surface modification structure of PDMS comprising:

a PDMS substrate with a surface;

an amphiphilic polymer layer deposited on said surface, and said amphiphilic polymer having a hydrophobic functional group and a reactive functional group;

a cross-linked stacking layer disposed on said amphiphilic polymer layer, and said cross-linked stacking layer comprising at least a thin layer having a positively charged functional group and at least a thin layer having a negatively charged functional group stacked alternately from the bottom; and a protein-adsorption resistant layer above said cross-linked stacking layer;

wherein said protein-adsorption resistant player is formed by a protein-adsorption resistant polymer comprising a reactive functional group, which is capable of reacting with said cross-linked stacking layer to form a covalent bond, said reactive functional group comprises an amino, carboxyl, aldehyde or ester functional group;

wherein a plurality of covalent bonds are formed between said amphiphilic polymer layer, said cross-linked stacking layer and the layers in said cross-linked stacking layer by the reactions of said reactive functional group, said positively charged functional group and said negatively charged functional group.

5. The structure of claim 4, wherein said protein-adsorption resistant polymer comprises PEG dialdehyde, PEG dicarboxylate or PEG diamine.

6. A substrate with long-term hydrophilic surface, comprising:

a polymer substrate with a surface;

an amphiphilic polymer layer disposed on said surface, said amphiphilic polymer having a hydrophobic functional group and a reactive functional group;

a cross-linked stacking layer disposed on said amphiphilic polymer layer, said cross-linked stacking layer comprising at least a thin layer having a positively charged functional group and at least a thin layer having a negatively charged functional group stacked alternately from bottom;

a protein-adsorption resistant layer disposed on said cross-linked stacking layer, said protein-adsorption resistant layer is formed by a protein-adsorption resistant polymer having a reactive functional group, which is capable of reacting with said cross-linked stacking layer to form a covalent bond; and a bio-molecule deposited on said protein-adsorption resistant layer;

wherein a plurality of covalent bonds are formed between said amphiphilic polymer layer and said cross-linked stacking layer, the layers of said cross-linked stacking layer, said cross-linked stacking layer and said protein-adsorption resistant layer, and said bio-molecule and said protein-adsorption resistant layer by the reactions of said reactive functional group, said positively charged functional group and said negatively charged functional group.

7. The substrate of claim 6, wherein said amphiphilic polymers comprising hydrolyzed polystyrene maleic anhydride (h-PSMA) which fabricated by hydrolyzing the anhydride groups of polystyrene maleic anhydride to produce carboxylate groups.

8. The substrate of claim 6, wherein said cross-linked stack layer having a thin layer of a positively charged functional group comprises polyethyleneimine (PEI), polyglucosamine, polyallylamine, polylysine or an amino-modified micron or nano-sized structure.

9. The substrate of claim 6, wherein said cross-linked stack layer having a thin layer of a negatively charged functional group comprises polyacrylic acid (PAA), polymethyl acrylate or a carbonyl-modified micron or nano-sized structure; said carbonyl group is a carboxyl, aldehyde or ester functional group.

10. The substrate of claim 6, wherein said protein-adsorption resistant polymer comprises PEG dialdehyde, PEG dicarboxylate or PEG diamine.

11. A method for preparing a substrate with long-term hydrophilic surface, comprising the steps as follow:

(a) providing a polymer substrate with a surface;

(b) forming an amphiphilic polymer layer on said surface, said amphiphilic polymer having a hydrophobic functional group and a reactive functional group;

(c) forming a cross-linked stacking layer on said amphiphilic polymer layer, said cross-linked stacking layer comprises at least a thin layer having a positively charged functional group and at least a thin layer having a negatively charged functional group stacked alternately from the bottom;

(d) forming a protein-adsorption resistant layer on said cross-linked stacking layer, wherein said protein-adsorption resistant layer comprises a reactive functional group; and (e) providing a cross-linking reagent in contact with said amphiphilic polymer layer and said cross-linked stacking layer to form covalent bonds between said amphiphilic polymer layer and said cross-linked stacking layer, and between the layers of said cross-linked stacking layer.

12. The method of claim 11, wherein said cross-linked stacking layer having a thin layer of positively charged functional group comprises polyethyleneimine (PEI), polyglucosamine, polyallylamine, polylysine or an amino-modified micron or nano-sized structure.

13. The method of claim 11, wherein said reactive functional group of said protein-adsorption resistant polymer comprises an amino, carboxyl, aldehyde or ester functional group.

14. The method of claim 11, further comprises a bio-molecule immobilized on said protein-adsorption resistant layer.

15. The method of claim 11, wherein said cross-linking reagent is EDC/NHS (1-ethyl-3-[3-dimethylaminopropyl] carbodiimide hydrochloride)/N-hydroxysuccinimide) or phosphoric acid/potassium sulfate of sodium cyanoborohydride.

* * * * *